J. F. POOL.
Grain Separator.
No. 81,288.
Patented Aug. 18, 1868.
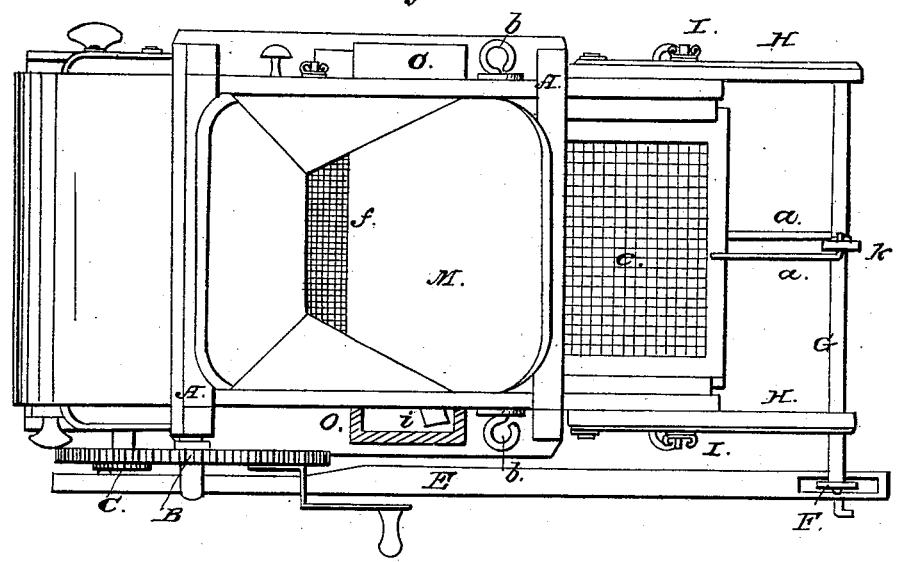
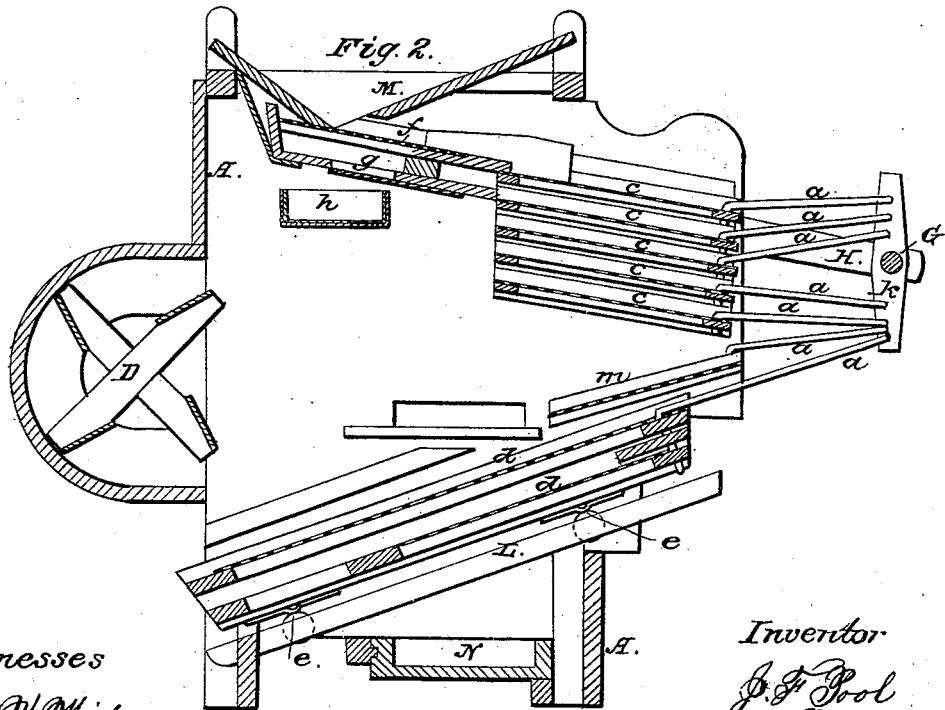

United States Patent Office.

J. F. POOL, OF MONROE, WISCONSIN.

Letters Patent No. 81,288, dated August 18, 1868.

---

IMPROVEMENT IN GRAIN-SEPARATOR.

---

The Schedule referred to in these Letters Patent and making part of the same.

---

TO ALL WHOM IT MAY CONCERN:

Be it known that I, J. F. POOL, of Monroe, in the county of Green, and State of Wisconsin, have invented certain new and useful Improvements in Grain-Separators; and I do hereby declare that the following is a full, clear, and exact description thereof, reference being had to the accompanying drawings, and to the letters of reference marked thereon, which form a part of this specification, in which—

Figure 1 is a plan view, and

Figure 2 is a side sectional view of my improved separator.

The nature of my invention consists in improvements upon my separator, patented January 14, 1868, and by which I save the grass-seed, and am enabled to make a third grade of wheat, or can adapt the screen to cockle or cheat, as the case requires.

In order to enable others skilled in the art to make and use my invention, I will now proceed to describe its construction and operation.

A represents a frame, of suitable material and dimensions.

B is the driving-wheel, which gears with a pinion, C, on the end of the fan-shaft, which shaft passes through a drum in the end of the machine, and on which the fan D is placed, inside of said drum.

On one side of the pinion, near its outer periphery, a rod, E, is pivoted, which, by means of the lever F, connects with the shaft G, giving said shaft a reciprocating motion.

This shaft G has its bearings in two arms, H H, which are placed, one on each side of the frame A, extending beyond the same. The inner ends of these arms are pivoted to the sides of the frame, and the outer ends are elevated or depressed at will by means of thumb-screws, I I, which penetrate a vertical slot in the frame.

K is a plate or bar, through the centre of which the shaft G passes, being firmly secured to it, so that the said bar is in an upright position. The plate or bar K is perforated with a number of holes for the hooks $a$ $a$, which connect it with the different screens. The upper screens $c$ $c$ are separate, and work in grooves on side-pieces fastened to the inner sides of the frame, and which side-pieces are adjustable by means of screws, $b$ $b$, which penetrate in an oblique slot in the frame.

The lower screens $d$ $d$ are connected so that one hook can operate them all, and rest on ways or rather on rollers, $e$ $e$, pivoted to ways, L L. These ways are also adjustable by means of thumb-screws in the frame A.

The screen $f$, under the hopper M, extends a little over the top of the top-screen $c$, and is secured to it by a screw or pin.

N is a drawer under the frame, to receive all substance which falls through the lower screens.

The grass-seed, in falling through the screen $f$, drops on a slide, $g$, which can be moved out of the way, and it will then fall into a box or drawer, $h$, which is inserted into the machine from one side of the frame, and extending through to the other. But if this slide is in its place, the grass-seed will pass out through a spout, $i$, on each side of the frame into conductors O O, and then be taken out through a hole in the lower part thereof, which hole is covered with a sliding lid.

The lower screens $d$ $d$, which, as described, are connected and attached to the bar K by one hook, are, nevertheless adjustable, so that the upper one of them can be slid down so as to leave a small open space above, or by changing the uppermost screen below and the lowermost screen above, they can be adapted to cockle or cheat, as the case requires.

Between the series of screens $c$ $c$ and the screens or sieves $d$ $d$, I add a smaller cross-screen, $m$, which is placed on ways in the sides of the frame A, and connected with the bar K by means of a similar hook, $a$.

Having thus fully described my improvements on my separator, patented as above mentioned, what I claim as new, and desire to secure by Letters Patent, is—

1. The spouts $i$ $i$, placed, one on each side of the frame A, and emptying into the conductors O O, substantially as and for the purposes herein set forth.

2. The box $h$, placed under the slide $g$, so that when said slide is removed, the grass-seed will drop into the same, substantially as herein set forth.

3. The adjustable and movable screens $d\ d$, when constructed as described, and operating as and for the purposes herein set forth.

4. The cross-screen $m$, placed between the series of screens $c\ c$ and screens $d\ d$, substantially as herein set forth.

In testimony that I claim the foregoing as my own, I affix my signature in presence of two witnesses.

J. F. POOL.

Witnesses:
    S. W. ABBOTT,
    W. H. PIERCE.